US008244787B2

(12) United States Patent
Principe et al.

(10) Patent No.: US 8,244,787 B2
(45) Date of Patent: Aug. 14, 2012

(54) OPTIMUM NONLINEAR CORRENTROPY FILTER

(75) Inventors: Jose C. Principe, Gainesville, FL (US); Puskal P. Pokharel, Bloomington, MN (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 1141 days.

(21) Appl. No.: 12/092,234

(22) PCT Filed: Oct. 31, 2006

(86) PCT No.: PCT/US2006/060397

§ 371 (c)(1), (2), (4) Date: Apr. 30, 2008

(87) PCT Pub. No.: WO2007/053831

PCT Pub. Date: May 10, 2007

(65) Prior Publication Data

US 2008/0293372 A1 Nov. 27, 2008

Related U.S. Application Data

(60) Provisional application No. 60/731,747, filed on Oct. 31, 2005.

(51) Int. Cl.
*G06F 17/10* (2006.01)

(52) U.S. Cl. ........................................................ 708/322

(58) Field of Classification Search ........................ None
See application file for complete search history.

(56) References Cited

U.S. PATENT DOCUMENTS

| | | | | |
|---|---|---|---|---|
| 5,602,964 | A | 2/1997 | Barrett | |
| 5,692,011 | A | 11/1997 | Nobakht et al. | |
| 5,748,847 | A | 5/1998 | Lo | |
| 7,742,806 | B2 * | 6/2010 | Sternickel et al. | 600/509 |
| 7,937,351 | B2 * | 5/2011 | Milenova et al. | 706/45 |
| 2001/0012988 | A1 | 8/2001 | Motz | |
| 2003/0099951 | A1 | 5/2003 | Akeson et al. | |
| 2004/0158440 | A1 | 8/2004 | Warburton et al. | |
| 2004/0164791 | A1 | 8/2004 | Batruni | |
| 2005/0125114 | A1 | 6/2005 | Atmur | |
| 2005/0288923 | A1 * | 12/2005 | Kok | 704/226 |
| 2007/0167846 | A1 * | 7/2007 | Sternickel et al. | 600/509 |
| 2009/0203343 | A1 * | 8/2009 | Principe et al. | 455/307 |

OTHER PUBLICATIONS

International Search Report and Written Opinion, dated Feb. 6, 2008.

* cited by examiner

*Primary Examiner* — David H Malzahn
(74) *Attorney, Agent, or Firm* — Thomas, Kayden, Horstemeyer & Risley, LLP

(57) ABSTRACT

A signal processing method is provided. The method includes receiving a signal input, and filtering the signal input using a nonlinear correntropy filter. The method additionally includes generating an output based upon the filtering of the signal input. The nonlinear correntropy filter can be configured as a nonlinear Wiener filter. Alternatively, the nonlinear correntropy filter can be configured as a correntropy least mean square (LMS) filter, or a correntropy Newton/LMS filter.

18 Claims, 5 Drawing Sheets

OPTIMUM NONLINEAR CORRENTROPY FILTER

CROSS-REFERENCE TO RELATED APPLICATIONS

This application is a §371 national stage entry of International Application No. PCT/US2006/060397, filed Oct. 31, 2006, which claims priority to U.S. Provisional Application No. 60/731,747, filed Oct. 31, 2005, both of which are hereby incorporated by reference.

STATEMENT REGARDING FEDERALLY SPONSORED RESEARCH OR DEVELOPMENT

This invention was made with government support under Grant No. ECS-0300340 awarded by the National Science Foundation. The government has certain rights in this invention.

FIELD OF THE INVENTION

The present invention is related to the field of signal processing, and, more particularly, to statistical-based signal detection and estimation.

BACKGROUND OF THE INVENTION

A filter, or estimator, typically refers to a system that is designed to extract information from a signal affected by or otherwise corrupted with noise. Accordingly, a filter is intended to extract information of interest from noisy data. Filter, or estimation, theory has been applied in a wide variety of fields, including communications, radar, sonar, navigation, seismology, finance, and biomedical engineering.

The Wiener filter, which remains one of the outstanding achievements of 20th Century optimal system design, optimally filters a signal. The filtering or estimation effected with the Wiener filter is optimal in the statistical sense of minimizing the average squared error between the desired and the actual output of a system. The Wiener filter extends the well-known solution of regression to linear functional spaces; that is, the space of functions of time, or Hilbert Space.

The manner in which Wiener filters are typically applied in digital systems and computers is in an L-dimensional linear vector space ($R^L$). This is due to the fact that the filter topology normally utilized in this context is a finite-duration impulse response (FIR) filter. Given an input signal x(n), considered to be stationary random process, and a desired response d(n), also a stationary random process, the best linear filter of order L for approximating the desired response d(n) in the mean square error sense is a FIR filter. The FIR filter is a weight vector $w=R^{-1}p$, where R is the autocorrelation matrix of the input signal and p is the crosscorrelation vector between the input signal x(n) and the desired response d(n).

Due to the properties of the autocorrelation function of real or complex stationary random processes, the weight vector w can be computed with an algorithmic complexity of $O(L^2)$. Alternatively, search procedures based on the least mean square (LMS) algorithm can find the optimal weight vector in O(L) time. Due to the power of the solution and its relatively straightforward implementation, Wiener filters have been extensively utilized in most, if not all, areas of electrical engineering.

There are three basic types of estimation problems: (1) filtering, which involves the extraction of information in real time (i.e., using data until time n); (2) smoothing, according to which the extraction is done at time $n_1<n$, where n represents the present time; and (3) prediction, according to which the extraction of information is done at a time or sample $n_2>n$. The Wiener filter is the optimal linear estimator for each one of these estimation problems.

There are four general classes of applications for Wiener filters: (1) identification, in which the input and desired response for the Wiener filter come from the input and output of an unknown plant (man-made or physical and biological systems); (2) inverse modeling, in which the input and desired response of the Wiener filter come respectively from the output of the plant and from its input (eventually with a delay included): (3) prediction, in which the input and desired responses to the Wiener filter are given respectively by the delayed version of the time series and the current sample; and (4) interference cancellation, in which the input and desired responses for the Wiener filter come respectively from the reference signal (signal+noise) and primary input (noise alone).

Wiener filters have also been applied in the context of multiple-input—single-input (MISO) systems and devices, such as beamformers, whereby several antennas are used to capture parts of the signal, and the objective is to optimally combine them. Additionally, Wiener filters have been applied in the context of multiple-input—multiple-output (MIMO) systems and devices, whereby the goal is to optimally estimate the best projection of the input to achieve simultaneous multiple desired responses. The engineering areas where Wiener filers have been applied include communication systems (e.g., channel estimation and equalization, and beam forming), optimal controls (e.g., system identification and state estimation), and signal processing (e.g., model-based spectral analysis, and speech and image processing). Not surprisingly, Wiener filters are one of the central pillars of optimal signal processing theory and applications.

Despite their wide-spread use, Wiener filters are solutions limited to linear vector spaces. Numerous attempts have been made to create nonlinear solutions to the Wiener filter, based in the main on Volterra series approximation. Unfortunately, though, these nonlinear solutions are typically complex and usually involve numerous coefficients. There are also two types of nonlinear models that have been commonly used: The Hammerstein and the Wiener models. The Hammerstein and Wiener models are characterized by static nonlinearity and composed of a linear system, where the linear system is adapted using the Wiener solution. However, the choice of the nonlinearity is critical to achieving adequate performance, because it is a linear solution that is obtained in the transformed space according to these conventional techniques.

Recent advances in nonlinear signal processing have used nonlinear filters, commonly known as dynamic neural networks or fuzzy systems. Dynamic neural networks have been extensively used in the same basic applications of Wiener filters when the system under study is nonlinear. However, there typically are no analytical solutions to obtain the parameters of neural networks. They are normally trained using the backpropagation algorithm or its modifications (backpropagation through time (BPTT) or real-time recurrent learning (RTRL), as well as global search methods such as genetic algorithms or simulated annealing.

In some other cases, a nonlinear transformation of the input is first implemented and a regression is computed at the output. A good example of this is the radial basis function (RBF) network and more recently the kernel methods. The disadvantage of these alternate techniques of projection is the tremendous amount of computation required, which makes them impractical for most real world cases. For instance, to implement kernel regression on a 1,000-point sample, a 1,000×1,000 signal matrix has to be solved. By comparison, if a linear Wiener filter of order 10 is to be computed, only a 10×10 matrix is necessary.

Accordingly, there is a need to extend the solutions for the Wiener filter beyond solutions in linear vector spaces. In particular, there is a need for a computationally efficient and effective mechanism for creating nonlinear solutions to the Wiener filter.

SUMMARY OF THE INVENTION

The present invention provides a nonlinear correntropy filter that can extent filter solutions, such as the those for the Wiener filter, beyond solutions in linear vector spaces. Indeed, the present invention can provide an optimal nonlinear correntropy filter.

Moreover, the invention can provide iterative solutions to a correntropy Wiener filter, which can be obtained using a least mean square and/or recursive least square algorithm using correntropy. The various procedures can provide optimum nonlinear filter solutions, which can be applied online.

One embodiment of the invention is signal processing method. The method can include receiving a signal input and filtering the signal input using a nonlinear correntropy filter. The method further can include generating an output based upon the filtering of the signal input. More particularly, the nonlinear correntropy filter can comprise a nonlinear Wiener filter, a correntropy least mean square (LMS) filter, or a correntropy Newton/LMS filter.

Another embodiment of the invention is a nonlinear filter. The nonlinear filter can include a signal input that receives a signal input from an external signal source. Additionally, the nonlinear filter can include a processing unit that generates a filtered signal output by filtering the signal input using a nonlinear Wiener filter, a correntropy least mean square (LMS) filter, or a correntropy Newton/LMS filter.

Still another embodiment of the invention is a method of constructing a nonlinear correntropy filter. The method can include generating a correntropy statistic based on a kernel function that obeys predetermined Mercer conditions. The method further can include determining a plurality of filter weights based upon the correntropy statistic computed. The plurality of filter weights, moreover, can be computed based on an inverse correntropy matrix, correntropy least mean square (LMS) algorithm or correntropy LMS/Newton algorithm.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION

Figure 1:
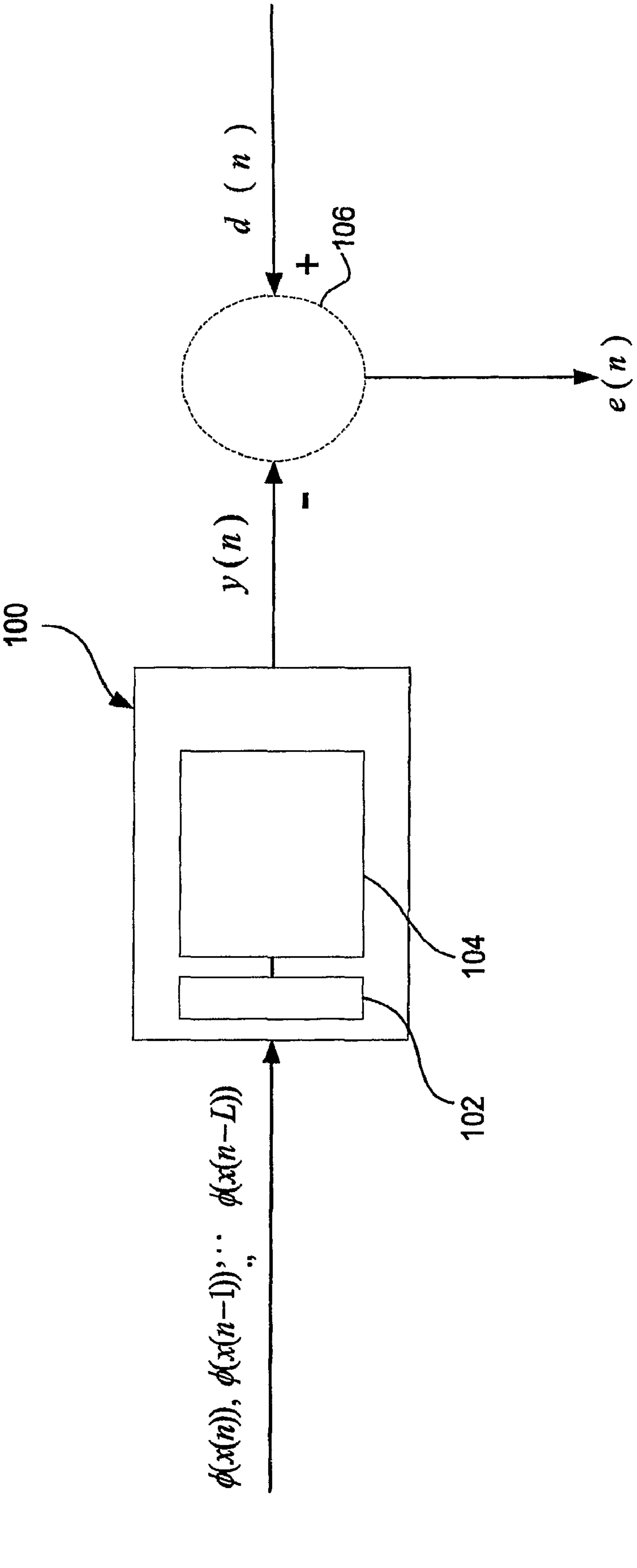
FIG. 1 is a schematic view of a correntropy filter, according to one embodiment of the invention.

The correntropy of the random process x(t) at instances $t_1$ and $t_2$ is defined as $$V(t_1,t_2)=E(k(x_{t_1}-x_{t_2})), \tag{1}$$

where E[·] is the expected value operator, and k, a is kernel function that obeys the Mercer conditions. The kernel function, k, can be, for example, the Gaussian function:

$$k(x)=\frac{1}{\sqrt{2\pi}\,\sigma}e^{-\left(\frac{x-\overline{x}}{\sqrt{2}\,\sigma}\right)^2}. \tag{2}$$

It will be apparent from the discussion herein that other functions can be used in lieu of the Gaussian function of equation (2). Indeed, the correntropy defined in equation (1) can be based on any other kernel function obeying the Mercer conditions as well. As will be readily appreciated by one of ordinary skill in the art, in accordance with the Mercer conditions k is both symmetric and positive definite.

The correntropy is a positive function that defines a unique reproducing kernel Hilbert space that is especially appropriate for statistical signal processing. According to one aspect of the invention, the samples $x_i$ of an input time series are mapped to a nonlinear space by $\phi(x_i)$, where $k(x_i,x_j)=<\phi(x_1),\phi(x_j)>$, the brackets denoting the inner product operation. When the Gaussian kernel is utilized, the input signal x(t) is transformed to the surface of a sphere of radius $$\frac{1}{\sigma\sqrt{2\pi}}$$

in kernel space. Therefore, correntropy estimates the average cosine of the angle between two points separated by a lag on the sphere.

Correntropy for discrete, strictly stationary and ergodic random processes can be estimated as $$\hat{V}(m)=\frac{1}{N-m+1}\sum_{i=0}^{N}k(x_i-x_{i-m}). \tag{3}$$

The relationship with information theoretic learning is apparent from the following. The mean of the correntropy estimate of a random process $x_k$ over the lag is $$\langle\hat{V}[m]\rangle=\frac{1}{2N-1}\sum_{m=-N+1}^{N-1}\frac{1}{N-|m|}\sum_{n=m}^{N-1}\kappa(x_n-x_{n-m}).$$

which equals the entropy of the random variable x estimated with Parzen windows $$V = \int_{-\infty}^{\infty}\left(\frac{1}{N}\sum_{n=0}^{N-1}\kappa(x-x_n)\right)^2 dx = \frac{1}{N^2}\sum_{n'=0}^{N-1}\sum_{n=0}^{N-1}\kappa'(x_n - x'_n),$$

where, as will be readily understood by one of ordinary skill in the art, entropy provides a measure of randomness, and the Parzen windows correspond to methods of estimating the probability density function of a random variable.

Wiener Filter Based On Correntropy

Another aspect of the invention is a nonlinear Wiener filter based on the correntropy function already described. According to this aspect of the invention, for an input $\phi(x(n))$ to a Wiener structure, $(L+1)$ being the order of the filter and $\phi$ being a function defined such that $E[k(x_i-x_j)]=E[\phi(x_i), \phi(x_j)]$, the following composite vector is generated using L lags of $\phi(x(n))$:

$$\Phi(n) = \begin{bmatrix} \phi(x(n)) \\ \phi(x(n-1)) \\ \vdots \\ \phi(x(n-L)) \end{bmatrix} \tag{4}$$

The (L+1) filter weights are given by the following vector:

$$\Omega = \begin{bmatrix} \omega_0 \\ \omega_1 \\ \vdots \\ \omega_L \end{bmatrix} \tag{5}$$

According to this formulation, the output is $$y(n) = \Omega^T\Phi(n) = \sum_{i=0}^{L}\omega_i\phi(x(n-i)) \tag{6}$$

The configuration of the filter, according to this aspect of the invention, follows from the following formulation of the optimization problem: Minimize the mean square error, $E\{y(n)-d(n)\}^2$ with respect to $\Omega$. Initially, $$E\{y(n)-d(n)\}^2 = E\{\Omega^T\Phi(n)-d(n)\}^{2*}$$

The optimization solution is determined as follows:

$$\frac{\partial\left(E\{\Phi(n)^T\Omega - d(n)\}^2\right)}{\partial\Omega} = 0 \tag{7}$$

$$\Rightarrow E\{-2[\Phi(n)(\Phi(n)^T\Omega - d(n))]\} = 0$$

$$\Rightarrow E\{\Phi(n)\Phi(n)^T\}\Omega = E\{d(n)\Phi(n)\}$$

$$V\Omega = E\{d(n)\Phi(n)\} \tag{8}$$

where, V is the correntropy matrix whose $ij^{th}$ element, for $i,j=1, 2, \ldots, L+1$, is $$E\{K(x(n-i+1),x(n-j+1))\}.$$

Moreover, assuming ergodicity, the expected value $E\{.\}$ can be approximated by the time average. Accordingly, $$\Omega = V^{-1}\frac{1}{N}\sum_{k=1}^{N}d(k)\Phi(k), \tag{9}$$

where $V^{-1}$ represents the inverse of the correntropy matrix and N is the number of samples in the window of calculation. The output, therefore, is $$\begin{aligned} y(n) &= \Phi^T(n)\Omega \\ &= \Phi^T(n)V^{-1}\frac{1}{N}\sum_{k=1}^{N}d(k)\Phi(k) \\ &= \frac{1}{N}\sum_{k=1}^{N}\sum_{j=0}^{L}\sum_{i=0}^{L}\phi(n-i)a_{ij}\phi(k-j)d(k) \\ &= \frac{1}{N}\sum_{k=1}^{N}d(k)\sum_{j=0}^{L}\sum_{i=0}^{L}a_{ij}\{\phi(n-i)\phi(k-j)\} \\ &= \frac{1}{N}\sum_{k=1}^{N}d(k)\sum_{j=0}^{L}\sum_{i=0}^{L}a_{ij}\{\phi(n-i)\phi(k-j)\} \\ &\cong \frac{1}{N}\sum_{k=1}^{N}\left\{d(k)\sum_{j=0}^{L}\sum_{i=0}^{L}a_{ij}K(x(n-i), x(k-j))\right\} \end{aligned} \tag{10}$$

where $a_{ij}$ is the $ij^{th}$ element of $V^{-1}$ the final expression is obtained by approximating $\{\phi(n-i)\phi(k-j)\}$ by $K(x(n-i),x(k-j))$, which holds good on an average sense. Equation 10 shows the calculation that needs to be done to compute the Wiener filter based on correntropy.

This solution effectively produces a nonlinear filter in the original space due to the mapping to the surface of infinite dimensional sphere, although the solution can still be analytically computed in the tangent bundle of the sphere. This aspect of the invention provides a significant advance over the conventional Wiener filter.

LMS Filter Based On Correntropy

The least mean squares filter can be derived by using the stochastic version of cost function (obtained by dropping the expected value operator in $J(\Omega)=E\{\Omega^T\Phi(n)-d(n)\}^2$ above) resulting in $\hat{J}(\Omega)=\{\Omega^T\Phi(n)-d(n)\}^2$ and the gradient given by $$\nabla\hat{J}(\Omega) = -e(n)\Phi(n), \tag{11}$$

where $e(n)=d(n)-\Omega^T\Phi(n)$ is the instantaneous error at time n.

Since the cost function is being minimized, the method of gradient descent is applied using the stochastic gradient (11). Thus the updated weight at each instant n is given by, $$\Omega_n = \Omega_{n-1} + \eta e(n)\Phi(n). \tag{12}$$

From (12) it follows that $\Omega_N$ is related to the initialization $\Omega_0$ such that $$\Omega_n = \Omega_0 + \eta\sum_{i=1}^{n-1}e(i)\Phi(i). \tag{13}$$

With $\Omega_0=0$, the output at n is given by $$y(n) = \Omega_n^T\Phi(n) = \eta\sum_{i=1}^{n-1} e(i)\{\Phi(i)^T\Phi(n)\} = \eta\sum_{i=1}^{n-1} e(i)\sum_{k=0}^{L}\{\phi(i-k)^T\phi(n-k)\} = \eta\sum_{i=1}^{n-1} e(i)\sum_{k=0}^{L} K(x(i-k), x(n-k)), \quad (14)$$

where $$\sum_{k=0}^{L}\{\phi(i-k)^T\phi(n-k)\}$$

is approximated by $$\sum_{k=0}^{L} K(x(i-k), x(n-k)).$$

It further follows from linear filtering theory that (14), which gives the correntropy least mean square (CLMS) filter, converges to minimize the original mean square error. According to the invention, the step size is chosen according the trade-off between the speed of convergence and the final excess mean square error or mis-adjustment. The solution (14) does not require regularization as employed in conventional methods that use kernels. Accordingly, the procedure provides a solution that is automatically regularized by the process of using the previous errors to estimate the next output.

Newton/LMS Filter Based On Correntropy

A better trade-off of misadjustment versus speed of convergence can be obtained at the expense of extra computation by incorporating a covariance matrix in the formulation (14). This results in $$y(n) = \eta\sum_{i=1}^{n-1} e(i)\sum_{j=0}^{L}\sum_{k=0}^{L} a_{ij}K(x(i-k), x(n-j)), \quad (15)$$

where $a_{ij}$ is the $ij^{th}$ element of $V^{-1}$. The solution (15) is termed the correntropy Newton/LMS (CN/LMS) filter.

It is to be noted at this juncture that the above-described techniques introduce an extra user-determined free parameter. The extra parameter to be determined by the user is the size of the Gaussian kernel that is used in the transformation to the sphere. It effectively controls the curvature of the infinitely dimensional sphere, and it affects the performance. There are three ways to set this free parameter: (1) given knowledge of the signal statistics, the user can apply Silverman's rule, known to those of ordinary skill in the art, applying the rule to set the kernel size as in a density estimation; (2) the user can employ maximum likelihood estimation in the joint space; or (3) the user can adaptively determine the free parameter using the LMS algorithm. Another degree of freedom is the choice of the kernel function. Although this invention does not specify the mechanisms of its choice, the mathematics of Mercer Theorem provide an inclusion of the invention to any such kernels.

FIG. 1 is a schematic illustration of a nonlinear correntropy-based filter 100, according to one embodiment of the invention. The nonlinear correntropy-based filter 100 illustratively comprises a signal preprocessor 102 for receiving a signal input, and a processing unit 104 for linear filtering the processed signal input. Note that the function $\phi(x)$ is implicitly defined by $E[k(x_i-x_j)]=E[\phi(x_i), \phi(x_j)]$ and both blocks have to be computed in tandem as stated above. The nonlinear correntropy-based filter 100 can be implemented in dedicated hardwired circuitry. Alternatively, the nonlinear correntropy-based filter 100 can be implemented in machine-readable code configured to run on a general-purpose or application-specific computing device comprising logic-based circuitry. According to yet another embodiment, the nonlinear filter 100 can be implemented in a combination of hardwired circuitry and machine-readable code.

According to a particular embodiment, the correntropy filter output $y(n)=\Phi_T(n)\Omega$ is computed by averaging over the data set the product of the desired signal samples with the Gaussian kernel of the input at the defined lags and weighted by the corresponding entries of the inverse of the correntropy matrix, as explained in equation 11.

Still referring to FIG. 1, the nonlinear correntropy-based filter 100, in one application, extends the Wiener filter in context of the statistical filtering problem. In particular, the filtered signal output y(n) generated by the nonlinear correntropy-based filter 100 is optionally supplied to a summer 106, to which a desired response d(n) is also supplied. The difference between the desired response d(n) and the filtered signal output y(n) provides an estimation error.

Figure 2:
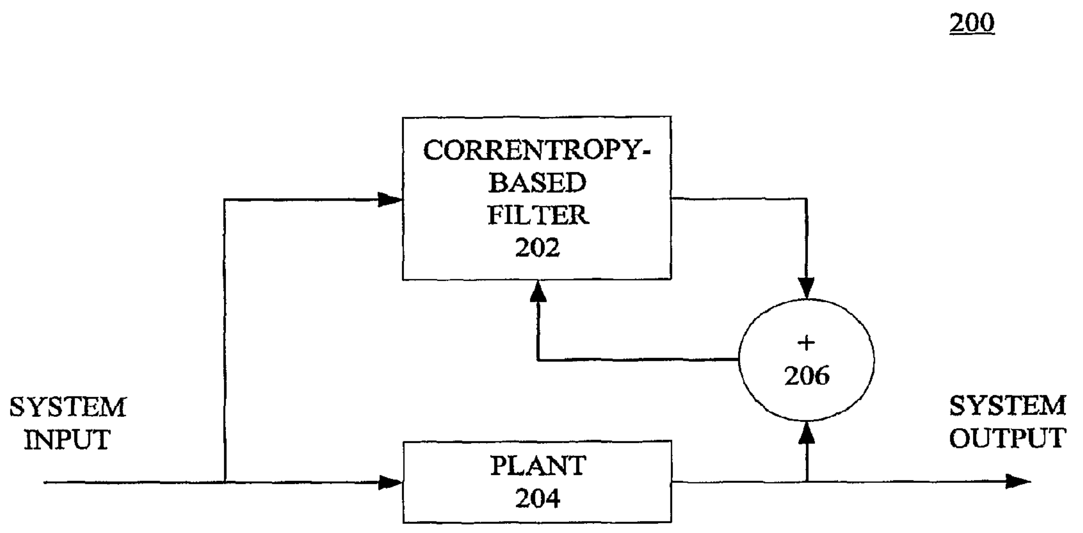
FIG. 2 is a schematic view of an application of a correntropy filter, according to another embodiment of the invention.

A particular application of the nonlinear correntropy-based filter is identification of a model representing an unknown plant. A system 200 for determining an identification is schematically illustrated in FIG. 2. The system 200 provides a model that represents the best fit, according to a predefined criterion, to an unknown plant. The system 200 comprises a nonlinear correntropy-based filter 202 and a plant 204 that is to be identified. Both the nonlinear correntropy-based filter 202 and the plant 204 are driven by the same input to the system 200. The filtered output generated by the nonlinear correntropy-based filter 202, based on the input, is supplied to a summer 206 along with the plant response to the same system input. The summer 206 generates an error based on the difference between the filtered output and the plant response. The nonlinear correntropy-based filter adaptively responds to the error term, through the illustrated feedback. The supply of system input and corresponding adaptation repeat until the best fit is obtained.

Figure 3:
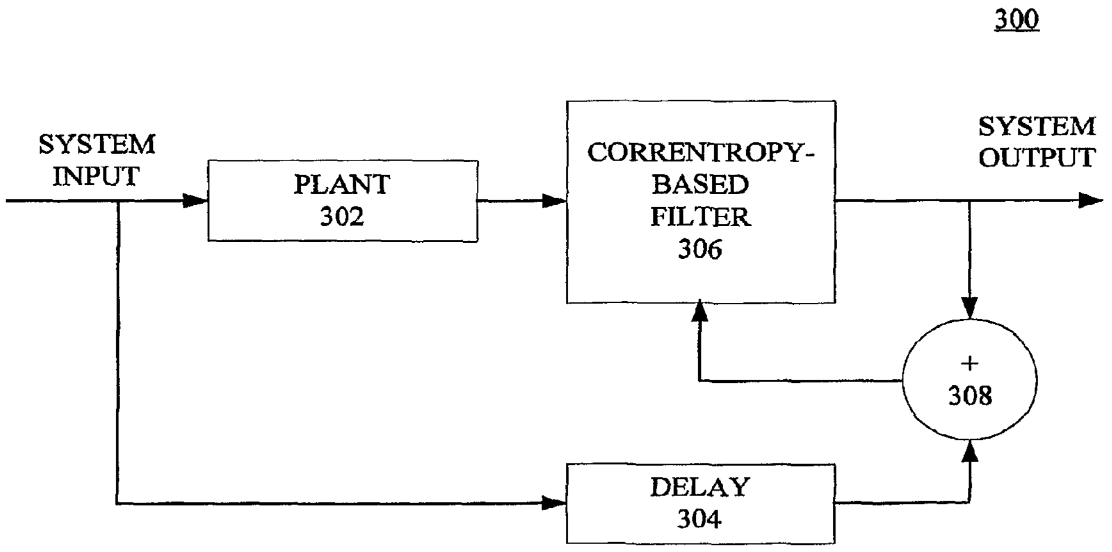
FIG. 3 is a schematic view of an application of a correntropy filter, according to yet another embodiment of the invention.

Another application of the nonlinear correntropy-based filter is that of inverse modeling of an unknown "noisy" plant, as will be readily understood by one of ordinary skill in the art. A system 300 for providing an inverse model is schematically illustrated in FIG. 3. The inverse model produced represents a best fit, again, according to a predefined criterion, of the unknown noisy plant. The system 300 comprises a plant 302 and a delay 304, which each receive the system input. Additionally, the system 300 includes a nonlinear correntropy-based filter 306 to which the output of the plant 302 is supplied. Based on the plant 302 output, the nonlinear correntropy-based filter 306 generates a filtered output.

The filtered output is supplied to a summer 308 along with the system input, the latter being delayed by the delay 304 interposed between the system input and the summer. The summer 308 generates an error based on the difference between the filtered output and the delayed system input. The nonlinear correntropy-based filter adaptively responds to the resulting error term, through the illustrated feedback. The supply of system input and corresponding adaptation repeat until the error meets a predefined criterion.

Figure 4:
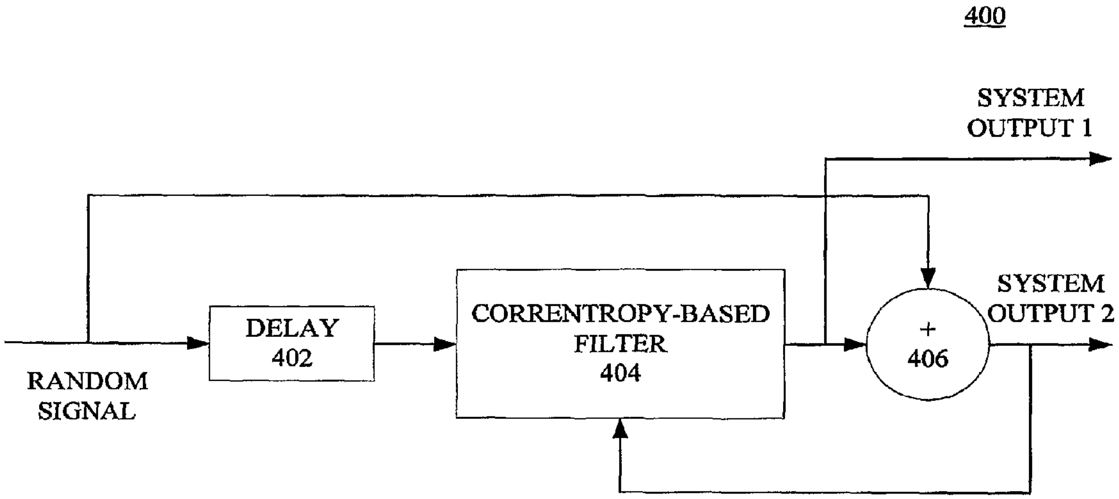
FIG. 4 is a schematic view of an application of a correntropy filter, according to still another embodiment of the invention.

Yet another application of the nonlinear correntropy-based filter is prediction. FIG. 4 provides a schematic illustration of a system 400 for generating predictions using the nonlinear correntropy-based filter. As shown, a random signal is supplied through a delay 402 to the nonlinear correntropy filter 404. The random signal is also supplied directly to a summer 406, as is the filtered output generated by the nonlinear correntropy-based filter 404. According to this arrangement, the nonlinear correntropy-based filter 404 provides a prediction of the present value of the random signal, the prediction being best in terms of a predefined criterion. The present value of the random signal represents the desired response of the nonlinear correntropy-based filter 404, while past values of the random signal supply inputs.

If the system is used a predictor, then the output of the system (system output 1) is the output of the nonlinear correntropy-based filter 404. If the system is used as a prediction-error filter, then the output of the system (system output 2) is the difference between the random signal and the output of the nonlinear correntropy-based filter 404, both of which are supplied to the summer 406.

Figure 5:
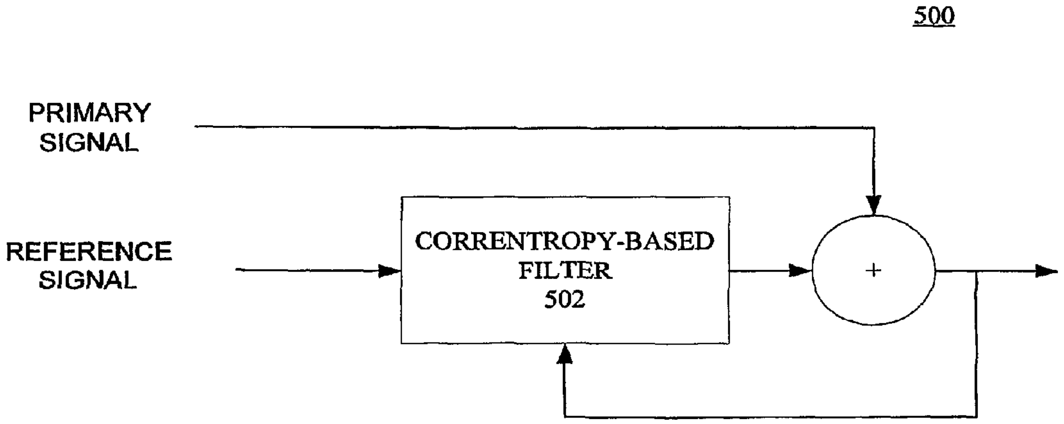
FIG. 5 is a schematic view of an application of a correntropy filter, according to yet another embodiment of the invention.

Still another application of the nonlinear correntropy-based filter is interference cancellation. A system 500 using a nonlinear correntropy-based filter 502 is schematically illustrated in FIG. 5. A primary signal is supplied to a summer 502, as is the output of the nonlinear correntropy-based filter 502 in the system 500. The primary signal is the desired response for the nonlinear correntropy filter 502. The output of the nonlinear correntropy-based filter 502 is based on a reference signal input. The reference signal can be derived from one or more sensors, which are positioned such that the information-bearing signal component is weak or otherwise difficult to determine. The system 500 is used to cancel unknown interference in the primary signal so as to enhance detection of the information content. The cancellation afforded by the nonlinear correntropy-based filter 502 is optimized according to a predefined criterion.

Figure 6:
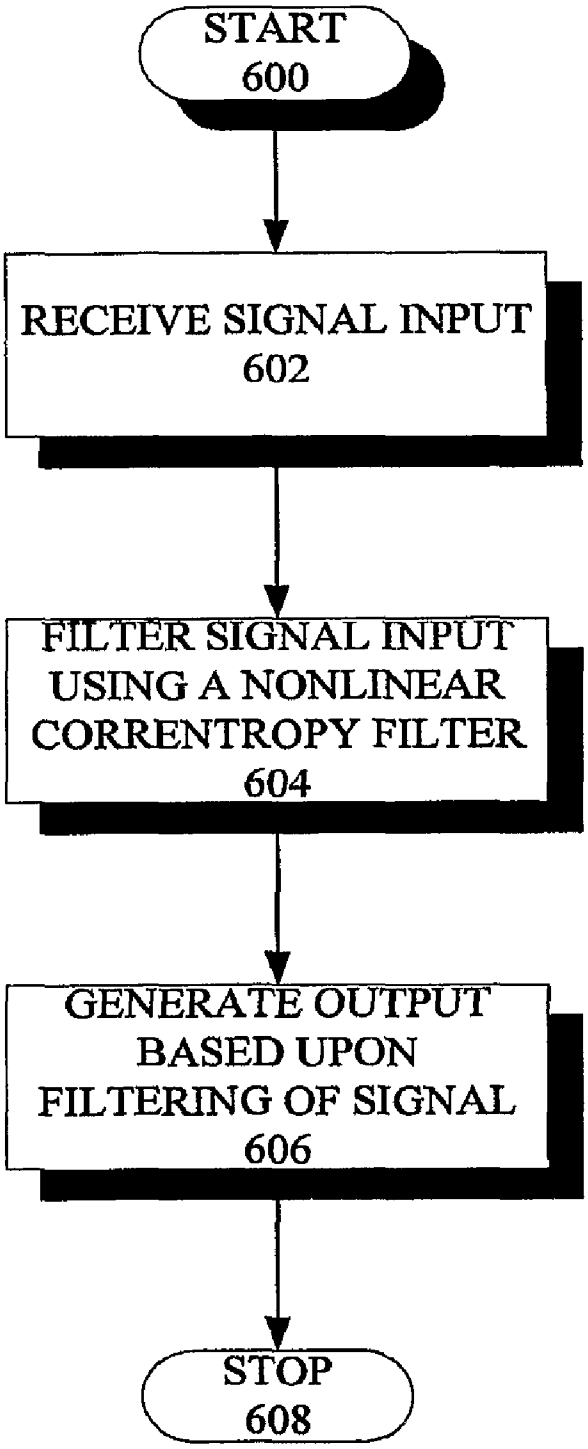
FIG. 6 is a flowchart of the exemplary steps of a method of a processing a signal based on nonlinear correntropy-based filtering, according to still another embodiment of the invention.

FIG. 6 is a flowchart of the exemplary steps of a method 600 of signal processing, according to still another embodiment of the invention. The method includes receiving a signal input at step 602. At step 604, the received signal is filtered using a a nonlinear correntropy filter. The method continues at step 606 with the generation of an output based upon the filtering of the signal input. The method illustratively concludes at step 608.

According to one embodiment of the method 600, the step of generating an output 606 comprises generating a prediction of a random signal, the prediction being a best prediction based upon a predetermined criterion. Moreover, the prediction can comprise an estimation of an error, whereby the error is based on a difference between an output generated by a system in response to the signal input and a predefined desired system output.

According to another embodiment of the method, the step of generating an output 606 comprises generating an identification of a nonlinear system. Alternatively, the step of generating an output 606 can comprise generating an inverse model representing a best fit to a noisy plant. According to yet another embodiment, the step of generating an output 606 comprises generating an inverse model representing a best fit to a noisy plant.

Figure 7:
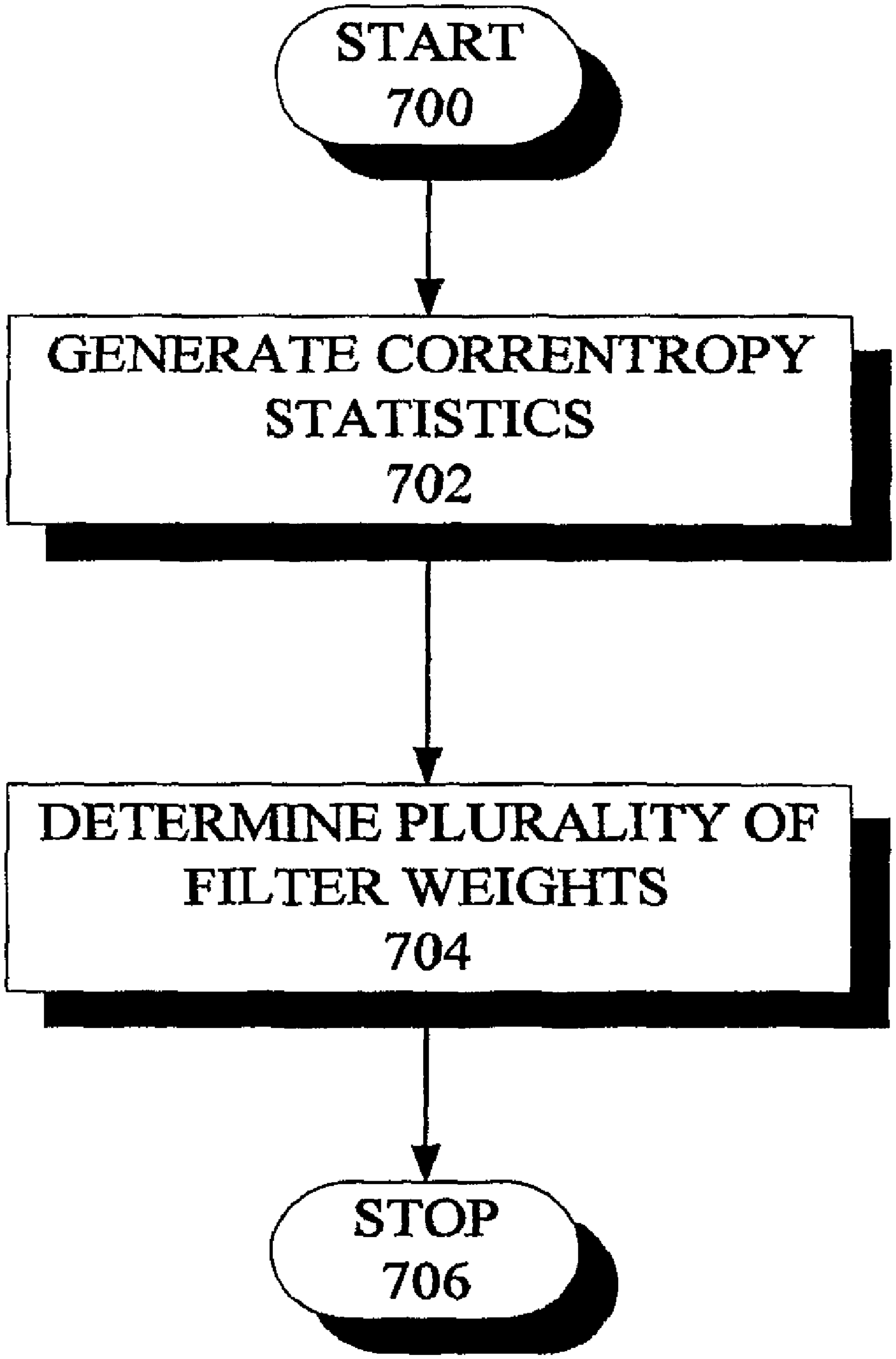
FIG. 7 is a flowchart of the exemplary steps of a method 700 for constructing a nonlinear correntropy filter, according to yet another embodiment of the invention.

FIG. 7 is a flowchart of the exemplary steps of a method 700 for constructing a nonlinear correntropy filter, according to yet another embodiment of the invention. The method 700 is based on the above-described equations relating to the determination of a correntropy statistic, V, and the determination of filter weights based on the correntropy statistic. The method 700 begins at step 702 with the generation of the correntropy statistic based on a kernel function that obeys the predetermined Mercer conditions, where the correntropy statistic, V is defined to be, as above, $V(t_1,t_2)=E(k(x_{t_1}-x_{t_2}))$, $E[\cdot]$ being the expected value operator, and k being the kernel function that obeys predetermined Mercer conditions. The method 700 continues at step 704 with the determination of the above-described filter weights, the filter weights being based upon the correntropy statistic as also described above. The method 700 concludes at step 706.

Yet another method aspect of the invention, is a method of generating a nonlinear function. The method, more particularly, comprises generating a correntropy function as already described and computing an expected value of the correntropy function. The method further includes generating a nonlinear function for which the expected value of the pairwise product of data evaluations is equal to the expected value of the correntropy function.

As noted herein, the invention can be realized in hardware, software, or a combination of hardware and software. The invention, moreover, can be realized in a centralized fashion in one computer system, or in a distributed fashion where different elements are spread across several interconnected computer systems. Any kind of computer system or other apparatus adapted for carrying out the methods described herein is suited. As also noted herein, a typical combination of hardware and software can be a general purpose computer system with a computer program that, when being loaded and executed, controls the computer system such that it carries out the methods described herein.

The invention also can be embedded in a machine-readable storage medium or other computer-program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

We claim:

1. A signal processing method, comprising receiving a signal input;

filtering the signal input using a nonlinear correntropy filter to produce a filtered signal; and generating an output signal based upon the filtered signal, wherein the nonlinear correntropy filter comprises an algorithm that computes an autocorrentropy matrix of the input signal multiplied by a cross correntropy vector between the signal input and a target signal, wherein the target signal comprises a user specified function.

2. The method of claim 1, wherein the target signal is a current sample of the input signal, and a filter input to the nonlinear correntropy filter is delayed by one sample such that the nonlinear correntropy filter predicts the future values of the input signal.

3. The method of claim 2, wherein the target signal is a sample of a previously received portion of the input signal, such that the correntropy filter smoothes a noisy component associated with the input signal.

4. The method of claim 1, wherein generating an output signal comprises generating an identification of a nonlinear system.

5. The method of claim 1, wherein generating an output signal comprises generating an inverse model representing a best fit to a noisy plant.

6. A nonlinear filter, comprising:

a signal input configured to receive a signal input;

a processing unit configured to generated a filtered signal input using a linear correntropy filter; and the processing unit further configured to generate an output signal based upon the filtered signal input;

wherein the linear correntropy filter comprises an algorithm that computes a linear finite impulse response filter, wherein the coefficients of the linear finite impulse response filter are adapted with a correntropy cost function.

7. The nonlinear filter of claim 6, wherein the signal input comprises a plurality of lagged discrete signals mapped by the correntropy cost function, and wherein the processing unit is configured to filter the projected signal input by applying a plurality of filter weights in the projected space to the lagged discrete signals.

8. The nonlinear filter of claim 7, wherein each of the plurality of filter weights is based on a minimization of an expected value between the desired output and the filtered signal in the projected signal space by the correntropy function.

9. The nonlinear filter of claim 7, wherein the lagged discrete signals comprise signals characterized as ergodic signals, and wherein the plurality of filter weights is computed based on an inverse correntropy matrix, correntropy LMS algorithm or correntropy LMS/Newton algorithm.

10. The method of claim 6, wherein a desired response is a current sample of the input signal, and a filter input of the correntropy filter is delayed by one sample such that the correntropy filter predicts the future values of the signal input.

11. The method of claim 6, wherein a desired response is a sample of a previously received portion of the input signal, such that the correntropy filter smoothes a noisy component associated with the input signal.

12. A signal processing system, comprising a nonlinear correntropy-based filter for generating a filter output by filtering a signal; and a summer for computing a difference between the filter output and a desired signal response.

13. The system of claim 12, further comprising a plant in electrical communication with the summer, the plant generating the desired signal response based upon a system input signal that is supplied to both the nonlinear correntropy-based filter and the plant.

14. The system of claim 12, further comprising a delay in electrical communication with the nonlinear correntropy-based filter to supply the signal thereto in response to receiving a random signal, the random signal also defining the desired signal supplied directly to the summer.

15. The system of claim 12, wherein the signal defines a reference signal, and wherein a primary signal is supplied directly to the summer.

16. A machine-readable storage medium, the medium comprising machine-executable instructions that:

generate a correntropy statistic based on a kernel function that obeys predetermined Mercer conditions, where the correntropy statistic, V is defined as $v(t_1,t_2)=E(k(x_{t_1}-x_{t_2}))$, E being an expected value operator, and k being the kernel function that obeys predetermined Mercer conditions; and determine a plurality of filter weights based upon the correntropy statistic computed wherein the plurality of filter weights is computed based on an inverse correntropy matrix, correntropy LMS algorithm or correntropy LMS/Newton algorithm.

17. The system of claim 12, wherein a desired response of the signal processing system is a current sample of the signal, and a filter input of the nonlinear correntropy-based filter is delayed by one sample such that the nonlinear correntropy-based filter predicts the future values of the signal.

18. The system of claim 12, wherein a desired response is a sample of a previously received portion of the signal, such that the nonlinear correntropy-based filter smoothes a noisy component associated with the signal.

* * * * *